(12) United States Patent
Noniewicz et al.

(10) Patent No.: US 6,179,116 B1
(45) Date of Patent: Jan. 30, 2001

(54) BEARING STAND

(75) Inventors: Zbiegniew Noniewicz, Kempenich; Winfried Ebert, Wiebern; Hans-Juergen Schueller, Koenigsfeld, all of (DE); Edmund Apolinski, Chicago; David Daniels, Lake Villa, both of IL (US)

(73) Assignee: Wolfcraft GmbH, Kempenich (DE)

( * ) Notice: Under 35 U.S.C. 154(b), the term of this patent shall be extended for 0 days.

(21) Appl. No.: 09/350,586

(22) Filed: Jul. 9, 1999

Related U.S. Application Data (63) Continuation-in-part of application No. 09/236,515, filed on Jan. 25, 1999, now Pat. No. 6,095,319.

(51) Int. Cl.[7] .................................................. B65G 21/00
(52) U.S. Cl. ........................................ 198/632; 198/861.1
(58) Field of Search .............................. 198/632, 860.1, 198/861.1, 313, 581; 193/35 TE; 108/116, 147.19, 147.2; 248/166, 439

(56) References Cited

U.S. PATENT DOCUMENTS

| | | | |
|---|---|---|---|
| 326,801 | * 9/1885 | Sprague | 198/632 |
| 501,242 | * 7/1893 | Buskin et al. | 198/581 X |
| 3,635,327 | * 1/1972 | Thiessen | 198/861.1 |
| 4,715,488 | * 12/1987 | Hewitt et al. | 198/861.1 X |
| 5,086,911 | * 2/1992 | Douglas | 198/313 |
| 6,095,319 | * 8/2000 | Noniewicz et al. | 198/632 |

* cited by examiner

Primary Examiner—James R. Bidwell
(74) Attorney, Agent, or Firm—Schiff Hardin & Waite

(57) ABSTRACT

A combination adjustable height bearing stand and roller platform assembly is provided which can be fixed at a pre-adjusted height. The combination bearing stand and roller assembly includes two pairs of legs with each pair of legs being pivotally connected together at a joint connection so that the legs can be brought from a parallel position used for storage to an angled position. The corresponding legs of the two pairs of legs are connected by cross-connectors. The legs are tubular and one leg of each pair of legs receives a height-adjustable support which can be secured at a pre-selected height by a fixing element. The top ends of the height-adjustable support are connected to fastening elements which, in turn, are pivotally connected to two carriers which support a platform assembly. Both the platform and bearing stand legs are pivotable between a collapsed and parallel storage position to an angled and horizontal position respectively using a single motion.

22 Claims, 11 Drawing Sheets

BEARING STAND

This is a continuation-in-part of U.S. patent application Ser. No. 09/236,515, filed Jan. 25, 1999, U.S. Pat. No. 6,095,319.

FIELD OF THE INVENTION

The present invention relates to a bearing stand for assemblies such as rollers which can be fixed at a preadjusted height. More specifically, the present invention relates to a bearing stand with two pairs of legs, each pair comprising two legs which are connected at a joint and which can be brought from a parallel position into an angled position.

BACKGROUND OF THE INVENTION

Bearing stands are known in widely varying embodiments and serve as support for lengthening the supporting surface of saw tables or workbenches. To this end, the assembly, which can be fastened at an adjustable height, can comprise a roller in order to enable an easy displacement of the supported work piece. It is also known to fold together such a bearing stand so as to save space, as needed, to which end the legs, which are connected at joints, are brought from an angled position into a parallel position. The supports bearing the assembly penetrate the joint of each pair of legs, halving the angle between the allocated legs, given a perpendicular orientation of each support.

With respect to the abovementioned prior art, it is considered a technical problem to improve the handling of a bearing stand of the type in question, particularly with respect to the handling in the course of the setup, or respectively, the collapsing.

SUMMARY OF THE INVENTION

This problem is initially and essentially solved by utilizing the fastening elements that comprise a triangular plate, which is fastened at the end of a support—in a plane-parallel fashion and at a distance from an outward facing support surface of the support, which is fashioned as a rectangular tube—by means of two screws that are respectively situated at a corner borehole of the triangular plate, the terminal screw simultaneously forming the axis of rotation for a carrier of the assembly. The carrier forms a bearing projection which projects into the space between the triangular plate and lateral surfaces of the support and which accepts a threaded stem of a screw handle in an inner thread. It is therefore possible to clamp or jam the screw handle in a slot opening arranged in the third corner of the triangular plate.

As a consequence of this construction, the handling of a bearing stand of the type in question is improved to the extent that the assembly that is borne by the supports is fastened at the bearing stand for the swivelling displacement of same, for example, from a horizontally oriented operative position into a position approximately parallel to the supports, in which latter position the bearing stand and the assembly can be stored in a space-efficient manner. The handling is simplified here.

The fixing of the assembly in the operative position, preferably in the horizontal orientation, occurs by clamping the bearing projection of the carrier between the triangular plate at the bearing stand side and the support surface of the support, which surface is allocated to this plate and which faces outward. To this end, a threaded stem at the carrier side submerges into a slot opening, which is arranged in the swivel path, of the triangular plate. It is possible to select the slot length such that, on the basis of the stopping of the threaded stem at the slot bottom, the desired position, preferably the horizontal position, is achieved.

The third corner of the triangular plate, which comprises the slot opening, preferably projects from the support at the bearing stand side. The two other corners of the triangular plate are situated in a plane-parallel fashion at a distance from the outward facing surfaces of the allocated support.

In another development of the subject matter of the invention, it is provided that the carrier is constructed as an angle plate, the vertical side of the angle plate forming the bearing projection. The horizontal portion of the angle plate serves for the fastening of the assembly. To this end, it is preferable for the fastening elements to engage approximately in the middle of the carrier. As a result, there is a stable, tilt-proof bearing and fastening of the assembly. In an embodiment, the bearing projection is a trapezoidal projection of a vertical side of the angle plate. It can be advantageously provided that the triangular plate has the contour of an obtuse triangle, with the axis of rotation in the obtuse angle. In this regard, it is also preferable that the side of the triangular plate that is allocated to the support extends parallel to the longitudinal extent of the support, and that the side of the triangle which is allocated to the assembly in the operative position and which comprises the slot opening extends horizontally. The triangular plate can also be constructed as an isosceles triangle, the equal sides being the support side and the horizontal side.

In a preferred embodiment of the inventive subject matter, it is provided that the threaded stem, in the form of a neck of enlarged diameter, verges into the screw handle, which neck rests positively in an end of the slot of enlarged diameter in the captive position. Accordingly, the slot of the triangular plate tapers in the direction of the slot opening in the manner of a bottleneck. To release the immobilization, a back-rotation in the loosening direction of the screw handle is required, until the neck of enlarged diameter of the threaded stem exits the region of the slot, and the region of a smaller diameter of the threaded stem can be swivelled through the slot narrow. The desired working position of the assembly, preferably the horizontal position, is defined by a stop limit for the triangular plate, which stop limit is screwed into the bearing projection. This can be a matter of a peg which is screwed in or some such. It is preferable, however, for the stop limit to be formed by the head of a screw which is provided with a self-cutting thread.

The described height adjustability can be present in that the supports telescope into the legs, and that the fastening means are formed by bolts which can be inserted through openings of the supports and which brace on the margin edges of the legs. To this end, the supports can comprise a plurality of spatially separated openings, preferably evenly spaced. In addition, a protection against the withdrawal of the supports from the legs is also provided. In this regard, it is proposed that the supports, which stand in sleeves, or respectively, in legs shaped in the manner of sleeves, are protected against a complete withdrawal in that a projection which is allocated to the inserted end of the support contacts a stop shoulder arranged in the region of the sleeve mouth. A reversible withdrawal protection can be provided.

A development in which the withdrawal protection is permanently activated upon the first insertion of the supports into the sleeves/legs is preferred, however. It is thus provided that the projection is constructed as a bellied-out portion of the support. Particularly given a development of the support as a square welded pipe, this sort of bellied-out portion is possible by means of concerted outward pressure.

In addition, it is preferable for the stop shoulder to be the face edge of a free tongue of the sleeve wall. This tongue can deflect in a springing manner in the original insertion of the support, in order to subsequently stand in the way of the projection, or respectively, the bellied-out portion of the support, blocking in the withdraw direction. The tongue can already be pushed into the blocking position at the factory. However, it is also possible, given a fixing the height of the support by means of strain elements, to perform the displacement of the tongue into the blocking position in the original loading, directly or indirectly via a clamping element.

The assembly can be formed in the shape of rollers or a tabletop, for example, whereby, with regard to the latter development, it is suggested that the tabletop be a carrier of a table saw and that it comprise, in its central region, a surface portion that can be cut out. To this end, a contour is provided on the tabletop (in the form of a broken line, for example) for the exact cutting of the surface portion. Through this cuttable surface portion, the shavings which accrue in the sawing can be removed below, whereby it is advantageously provided in this regard that the space below the cuttable surface is clear for chip removal. A cross-tie is then provided which crosses the cuttable opening and which connects the two joint connections, in order to stabilize the entire bearing stand by forming a closed frame. With respect to the material selection of the tabletop, it is suggested that this consist of wood or of a wood-like hard-fiber material.

In an embodiment, the present invention provides a combination adjustable height bearing stand and platform assembly, the combination bearing stand and platform assembly that comprises two pairs of legs, the pair of legs being pivotally linked together at a joint connection for pivotal movement with respect to one another between a parallel position into an angled position, one of the legs hollow and telescopically receiving a height-adjustable support, each height-adjustable support being secured in place by a fixing element disposed above the joint connection, each height-adjustable support comprising a distal end connected to a fastening element, each fastening element being connected to a bearing projection connected to a carrier, each carrier being connected to and supporting a platform assembly, each bearing projection also being connected to a screw handle, each fastening element comprising a triangular plate having three corners including a first corner connected to a distal end of its respective height-adjustable support, a second corner pivotally connected to its respective bearing projection and a third corner comprising a slot for receiving the screw handle connected to its respective bearing projection.

In an embodiment, each carrier comprises an elongated angle plate.

In an embodiment, each carrier comprises a mid-section and each bearing projection is connected to the mid-section of its respective carrier.

In an embodiment, each bearing projection is trapezoidally shaped and extends downward from the carrier.

In an embodiment, each angle plate comprises a vertical wall and each bearing projection is trapezoidally shaped and extends downward from the vertical wall of its respective carrier.

In an embodiment, each triangular plate is an obtuse triangle with the second corner of each triangular plate being obtuse angled.

In an embodiment, each screw handle comprises a stem with an enlarged neck portion and a threaded portion and each bearing projection comprises a threaded aperture for receiving the threaded portion of the stem of its respective screw handle and the slot disposed in the third corner of each triangular plate accommodates the enlarged neck portion of the stem of its respective screw handle.

In an embodiment, the bearing projection further comprises a stop limit for engaging the third corner of its respective triangular plate.

In an embodiment, each stop limit comprises a screw.

In an embodiment, each screw comprises a head for engaging the third corner of its respective triangular plate and a self-cutting thread portion.

In an embodiment, each fixing element comprises a bolt and each adjustable support comprises at least one through hole for receiving the bolt and the each leg that telescopically receives one of the adjustable supports comprises an edge for engaging the bolt passing through its respective adjustable support.

In an embodiment, each adjustable support comprises a lower end telescopically inserted into one of the legs, the lower end of each support comprising an outwardly projecting section, each of the legs that telescopically receives one of the adjustable supports comprises an upper end that comprises a stop shoulder for engaging the outwardly projecting section of its respective adjustable support to prevent a complete withdrawal of the adjustable supports from upper ends of their respective legs.

In an embodiment, each outwardly projection section comprises a bellied-out portion of its respective adjustable support.

In an embodiment, each stop shoulder comprises an inwardly extending tongue.

In an embodiment, the platform assembly comprises a table top for supporting a saw.

In an embodiment, the table top comprises a removable center portion.

In an embodiment, the platform assembly further comprises an open space disposed below the removable center portion for scrap removal.

In an embodiment, the platform assembly further comprises a tie bar that extends underneath the removable portion and that connects the two carriers together.

In an embodiment, the table top comprises wood.

In an embodiment, each pair of legs comprising a shorter leg and a longer leg, each shorter leg being hollow and telescopically receiving one of the height-adjustable supports.

In an embodiment, a combination adjustable height bearing stand and roller platform assembly is provided that comprises two pair of legs, each pair of legs comprising a shorter leg and a longer leg. The shorter leg and longer leg of each pair of legs being pivotally linked together at a joint connection for pivotal movement with respect to one another between a parallel position and an angled position. Each shorter leg being hollow and matably receiving a height-adjustable support. Each height-adjustable support being secured in place by a fixing element disposed at the joint connection. Each height-adjustable support further comprising a distal end connected to a fastening element. Each fastening element being connected to and supporting a platform assembly.

In an embodiment, each fastening element is connected to an elongated carrier. The elongated carriers being disposed parallel to one another with at least one roller extending between the elongated carriers.

The elongated carriers each comprising a L-shaped cross-section and further comprising a support section disposed parallel to the at least one roller.

In an embodiment, each carrier is pivotally connected to its respective fastening element. Each carrier also being connected to a spindle. The carriers being pivotable between a storage position where the carriers are disposed parallel to the supports and a horizontal position where each spindle engages its respective fastening element.

In an embodiment, movement of the carriers from the storage position to the horizontal position is in the same direction as movement of the shorter legs from the parallel position to the angled position.

In an embodiment, the shorter legs are connected by a first cross-connector and the longer legs are connected by a second cross-connector.

In an embodiment, at least two rollers are provided and the rollers are adjustably connected to each carrier so that the height of each roller can be adjusted when the carriers are in the horizontal position.

In an embodiment, each roller comprises two axial extensions and each carrier comprises at least two inverted U-shaped bearing slits, each inverted U-shaped bearing slit accommodating one of the axial extensions of one of the rollers. Each inverted U-shaped bearing slit further comprising two leg sections having different lengths so that moving the axial extension accommodated therein from one leg section to the other leg section changes the height of the respective roller when the carriers are in the horizontal position.

In an embodiment, each carrier comprises an angle plate.

In an embodiment, the carriers each comprise an upper horizontal edge and each roller can be displaced from a lower position where the roller is disposed beneath the upper horizontal edge to a higher position where at least a portion of the roller projects vertically above the upper edge of each carrier when the carriers are in a horizontal position.

In an embodiment, each shorter leg comprises a lower free end and each longer leg comprises a lower free end. The first and second cross-connectors connecting the lower free ends of the shorter legs and longer legs respectively.

In an embodiment, the first and second cross-connectors each comprise opposing extensions which extend laterally beyond the lower free ends of the shorter and longer legs respectively. Each extension being connected to a standing cap.

In an embodiment, the standing caps comprise a plurality of radially extending ribs for enhancing traction.

In an embodiment, the spindles are connected to a handle.

In an embodiment, each carrier comprises a slit for accommodating its respective spindle when the carriers are moved to a horizontal position.

In an embodiment, the spindles are threaded and the handles are threadably connected to the spindles so that the handles may be tightened against the carrier when the carriers are moved to a horizontal position to secure the carriers in said horizontal position.

In an embodiment, the longer legs and shorter legs are tubular.

In an embodiment, the top ends of the longer and shorter legs are joined together at the joint connection by a U-shaped junction plate that comprises two opposing distal ends. The U-shaped junction plates wrap around the top end of one of the shorter legs with the top end of the longer leg of the pair of legs being disposed between the distal ends of the U-shaped junction plate. The distal ends of the U-shaped junction plate and the top end of the longer leg disposed therebetween are pivotally connected together by a hinge bolt.

The two legs of each pair do not have the same length, and the support inserts displaceably mounted in the shorter leg. The handling is facilitated by this design, particularly in the setup of the bearing stand. In addition, the bearing stand is thereby collapsible into the parallel position so as to save space, since, due to the supports which are inserted into the shorter legs.

The shorter legs do not contribute to the depth of the bearing stand in the collapsed position. Rather, the supports form an extension of the shorter legs which project beyond the joint and, together with the terminally arranged assembly, offer a handle for setting up the bearing stand. To this end, the bearing stand is grasped in the folded position in the region of the assembly or of the supports. A swivelling of the shorter legs subsequently occurs from the longer legs, which support the bearing stand on the ground, into the service position, which is preferably limited by a stop and is fixable. The supports form a lever for a shear-like opening of the pair of legs. The setup of the bearing stand into the service position can thus be performed by the user most easily in the upright position.

In a preferred development of the invention it is provided that the assembly forms carriers which are linked to the fastening elements in swivelling fashion. In the framework of this development, also, the assembly can be brought from the service position into a space-efficient position with collapsed leg pairs. The design is preferably selected such that, to set up the bearing stand into the service position, the swivelled assembly is grasped, and by means of pulling at said assembly, not only the assembly but also the pairs of legs are guided into the service position. To this end, it is provided that the carriers form a flat support with which the inventive bearing stand can be used as a support in typical fashion.

In addition, from a position which is parallel to the supports, the carriers can preferably be swivelled against a stop into a horizontal position. The parallel position of the carriers with respect to the supports contributes to the desired saving of space in the collapsed position. By the swivelling up into the horizontal position, a support plane is formed which is favorable for service and which, due to the adjustability of the height of the supports, can be adapted, for example, to an allocated saw table or workbench. It is inventively provided that the swivel direction of the carriers into the horizontal position is the same as the swivel direction of the legs into the angled position, thereby achieving the desired facilitation of the handling in the course of setting up the bearing stand.

In a preferred embodiment, it is provided that the opposed carriers bear at least one roller. By means of the latter, the supported work piece can be more easily displaced for processing at a saw table or a workbench, for example, and can thus be better conveyed to the point of processing. In order to also use the inventive bearing stand as a conventional support in which the easy displacement of the work piece is not desirable, it is provided that the height of the rollers is adjustable. On the basis of this design, the rollers are displaceable from a support position for the work piece into a lowered position. In this regard, it is also provided that the axial projections of the rollers sit in U-shaped bearing slits with U-legs of different lengths. This design provides the inventive adjustability of the height of the rollers most easily.

Because there is a plurality of rollers, there is individual use, whereby the height of each roller can be separately adjusted at its ends. The rollers can thus be brought into the height-displaced position with their axial extensions only at one end. If the height-adjusted side is alternated in a plurality of rollers, then a valley emerges in the displacement direction of the work piece, which is particularly advantageous given work pieces with an annular cross-section.

In further developments of the inventive subject matter, it is provided that the carrier is an angle plate. Beyond this, it has proven advantageous if the rollers are displaceable from a first position lying beneath the upper side of the carrier into a second position in which only the apex region of the rollers projects beyond the upper side of the carrier. To stabilize the bearing stand, it is provided that the connecting elements between the legs and the supports are respectively arranged at the free ends. This results in a region which is free of cross-struts between the foot regions of the legs and the end regions, allocated to the carriers, of the supports.

Furthermore, it is provided that the cross-connectors which connect the legs to each other form extensions on which bearing caps rest. The bearing caps are preferably profiled by ribs which extend in the axial direction, providing an increased stability under load. The profiled design of the bearing caps provides an anti-sliding device not only in the course of the setup of the stand but also during use.

To lock the selected assembly height, it is provided that the fixing means is formed by a threaded spindle which is provided with a handle and which acts non-positively on the ends of the supports, preferably in the region of the joint of the leg pairs. In addition, the horizontal position of the carriers can also be locked in that the stop is a threaded spindle which is provided with a handle and which dips into a slit opening.

A slit opening which is formed in a supporting plate at the terminal side of the supports is preferably allocated to each carrier. Subsequent to a swivelling of the carrier into the horizontal position, the threaded spindles lie in the respective slit openings. A non-positive fixing of the horizontal position can be subsequently achieved by tightening this threaded spindle.

In a further preferred embodiment, it is provided that the legs and the supports are constructed from tubular profiles. Furthermore, these tubular profiles are preferably constructed with a square cross-section. Finally, it is advantageous if the legs are fixed in the angled position only by the contact of an obliquely extending face of the longer leg at the shorter leg, and they are otherwise connected to each other without coupling bars.

Other objects and advantages of the invention will become apparent upon reading the following detailed description and appended claims, and upon reference to the accompanying drawings.

BRIEF DESCRIPTION OF THE DRAWINGS

The invention is detailed below with the aid of the enclosed drawing, which merely depicts an exemplifying embodiment. In the drawing.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
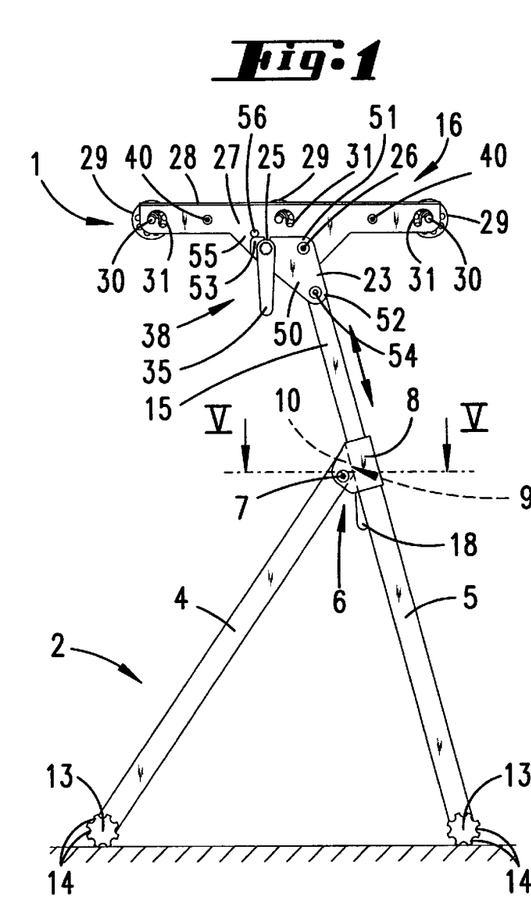
FIG. 1 is a side view of a bearing stand made in accordance with the present invention in a service position.
Figure 2:
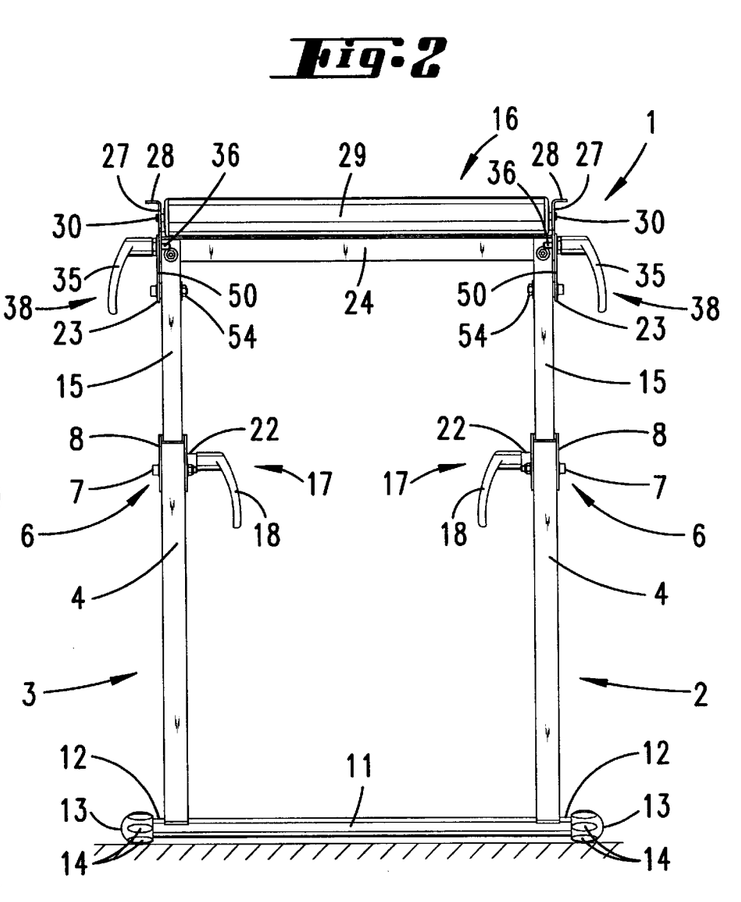
FIG. 2 is a front view of the bearing stand shown in FIG. 1.
Figure 3:
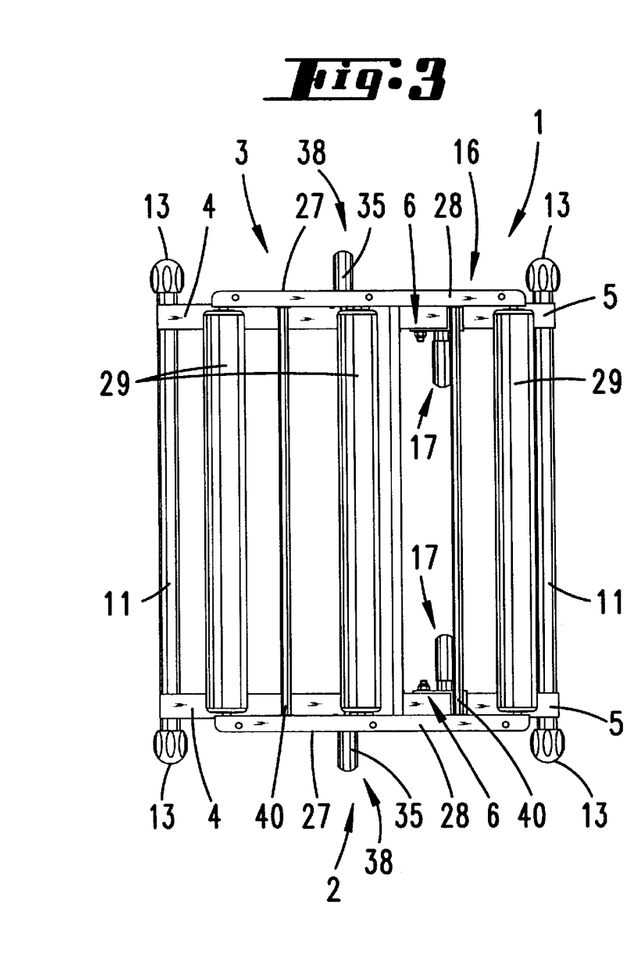
FIG. 3 is a top plan view of the bearing stand shown in FIG. 1.
Figure 4:
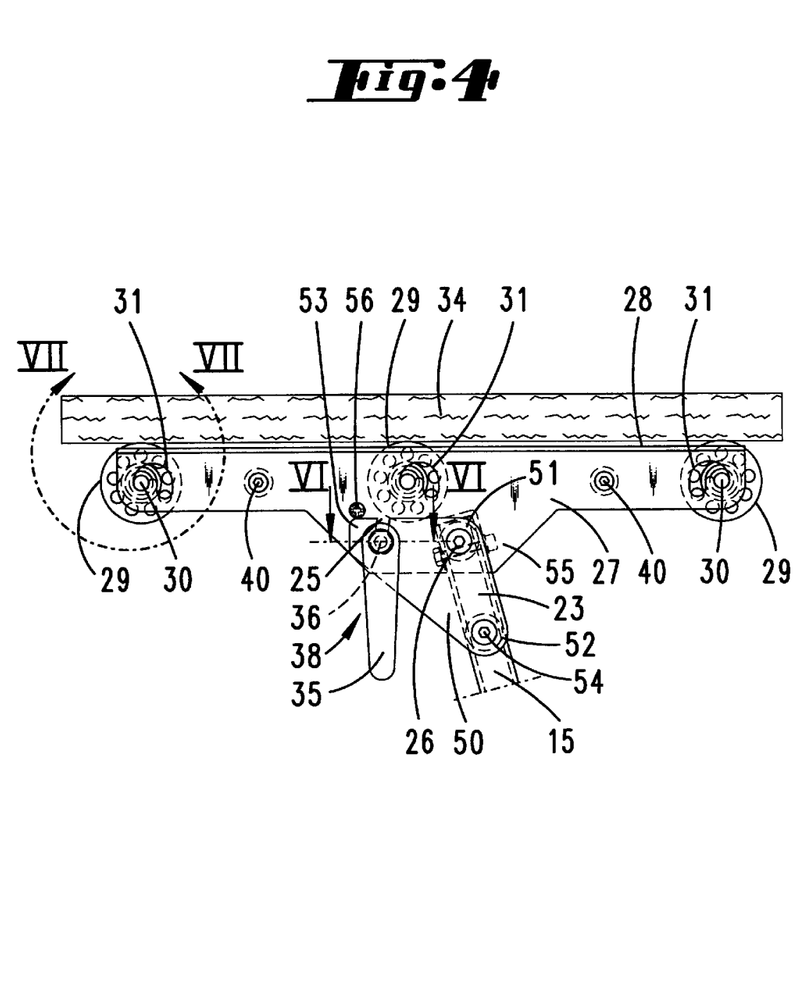
FIG. 4 is a partial enlarged view of the bearing stand of FIG. 1, depicting an assembly which comprises rollers, with a supported work piece.

With reference to FIGS. 1 and 2, a bearing stand 1 which comprises two pairs of legs 2, 3 is initially illustrated and described, a leg 4 of each leg pair 2, 3 being constructed longer than the other leg 5.

The legs 4 and 5 of each pair 2, 3 are linked via a joint 6. The latter is formed by a hinge bolt 7, which penetrates the leg 4 near the end which faces the leg 5, said bolt being mounted in a junction plate 8 with a U-shaped cross-section. The junction plate 8 surrounds the free end of the shorter leg 5 and is connected thereto by welding, for example. The freely projecting regions of the U-legs of the junction plate 8 accept the free end of the leg 4 between them. The hinge bolt 7 thus penetrates not only the U-legs of the junction plate 8 but also the free end regions of the legs 4.

The angled position of the legs 4 and 5 according to FIG. 1 is limited by a stop 9, which is formed by an obliquely extending face 10 of the longer leg 4. The face 10 of the longer leg 4 engages the shorter leg 5 in the angled position shown in FIG. 1.

In the region of the free ends, the mutually corresponding legs 4, or respectively, 5 of the two pairs 2 and 3 are connected by cross-connectors 11, which form extensions 12, which project out beyond the legs and on which bearing caps 13 rest.

To increase the stability bearing stand I under load, the bearing caps 13 are profiled by ribs 14, which extend in the axial direction of the cross-connectors 11, and are preferably produced from plastic.

The legs 4, 5 and the cross-connectors 11 are formed by tubular profiles. The legs 4, 5 are constructed with a square cross-section and the cross-connectors 11 being constructed with an annular cross-section.

The thusly formed chassis of the bearing stand 1 bears an assembly 16 via supports 15 having an adjustable height. The supports 15 are likewise formed from tubular profiles with a square cross-section and insert displaceably into the shorter leg 5, thus simultaneously penetrating the region of the junction plate 8.

Figure 5:
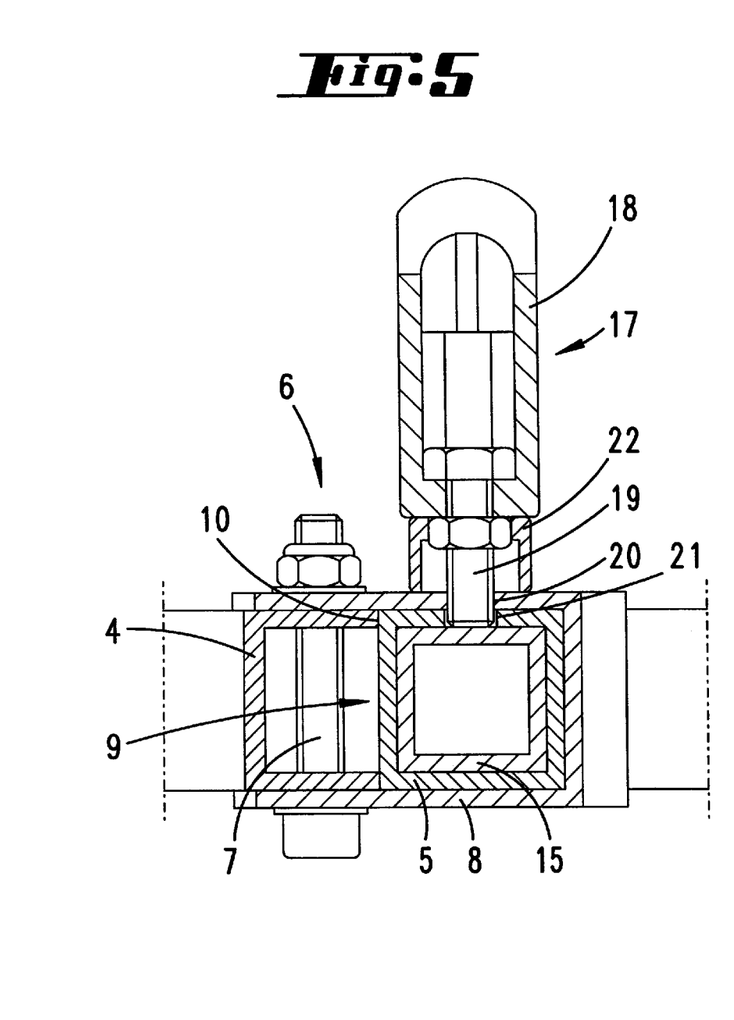
FIG. 5 is a sectional view along the line V—V in FIG. 1.
Figure 6:
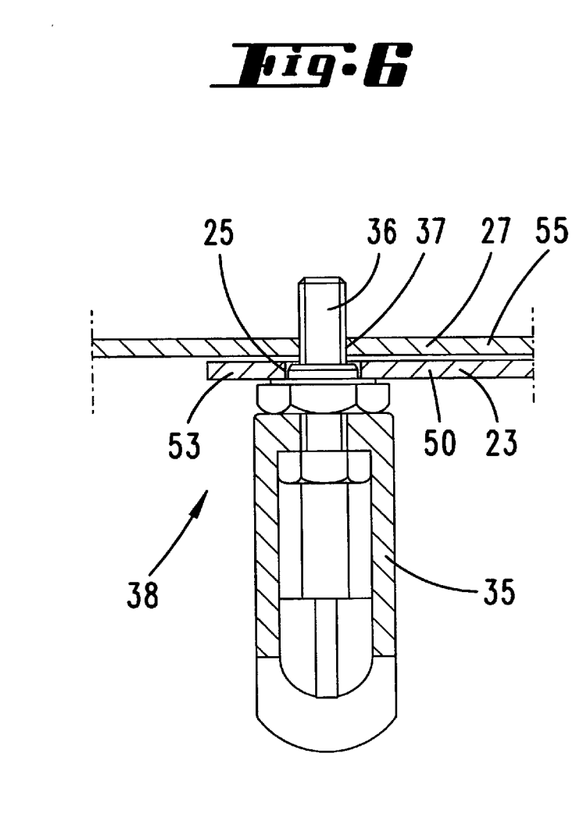
FIG. 6 is a sectional view along the line VI—VI in FIG. 4.
Figure 7:
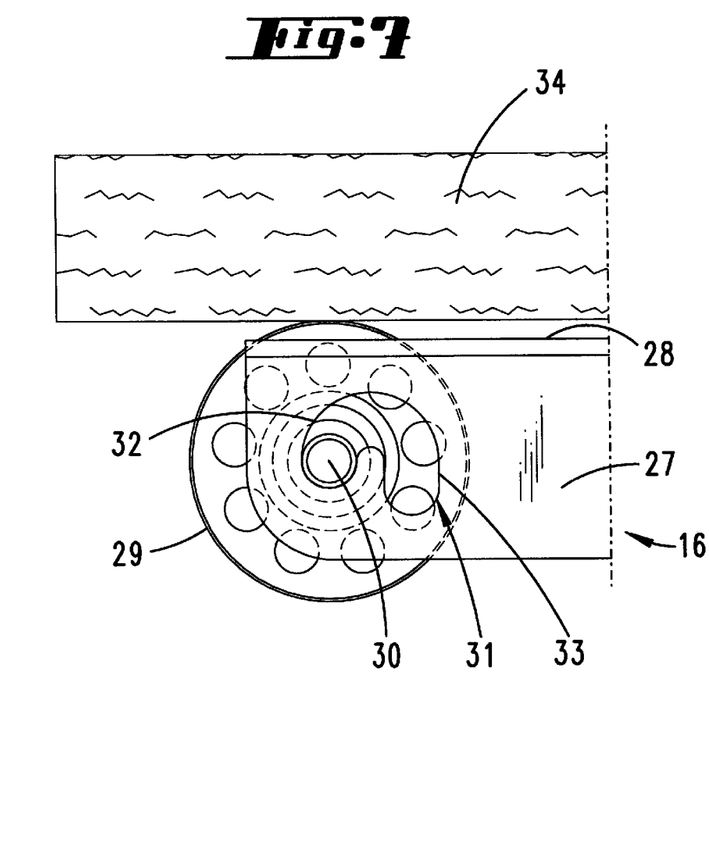
FIG. 7 is an enlarged sectional view taken along line VII in FIG. 4.

As shown in FIG. 5, each support 15 is fitted with its outer cross-section to the inner cross-section of the legs 5 and is thus guided telescopically into said inner cross-section. The selected assembly height can be locked with the aid of fixing means 17. Each fixing means 17 is formed by a threaded spindle 19 provided with a handle 18. Said spindle inserts into a threaded borehole 20 constructed in the junction sheet 8 and penetrates a correspondingly positioned borehole 21 of the shorter leg 5.

The locking occurs by the threaded spindle 19 striking, at the face, a lateral face of the support 15 in the course of the tightening of the threaded spindle 19 by rotation of the handle 18, the handle 18 being supported against the outer surface of the junction plate 8 via a distance sleeve 22. The support 15 is thus held non-positively in the leg 5 (cf. FIG. 5).

At their upper free ends, the supports 15 are provided with fastening elements 23 which are constructed as triangular plates 50. Furthermore, the two free ends of the supports 15 are connected by a cross-connector 24 formed by a tubular profile with a square cross-section. Together with the legs 5 and its cross-connectors 11, a frame is formed.

Each triangular plate 50 is fastened to the allocated support 15 in plane-parallel fashion and at a distance from the outward facing surface of this support. The triangular plate 50 comprises the contour of an obtuse triangle in which the sides of the triangle that form the obtuse angle are approximately the same length.

Figure 14:
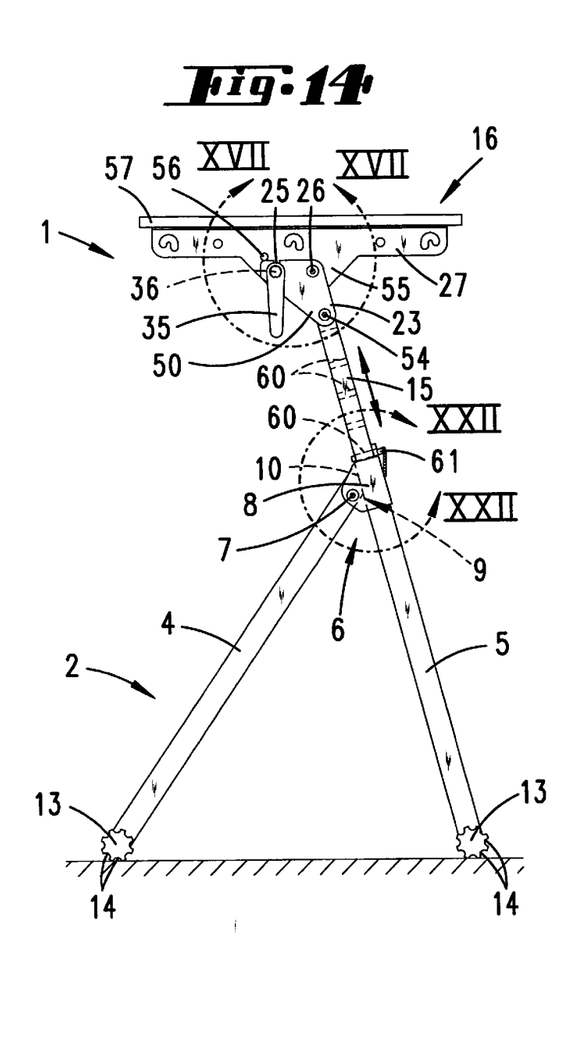
FIG. 14 is a side view of a second embodiment of the present invention.
Figure 15:
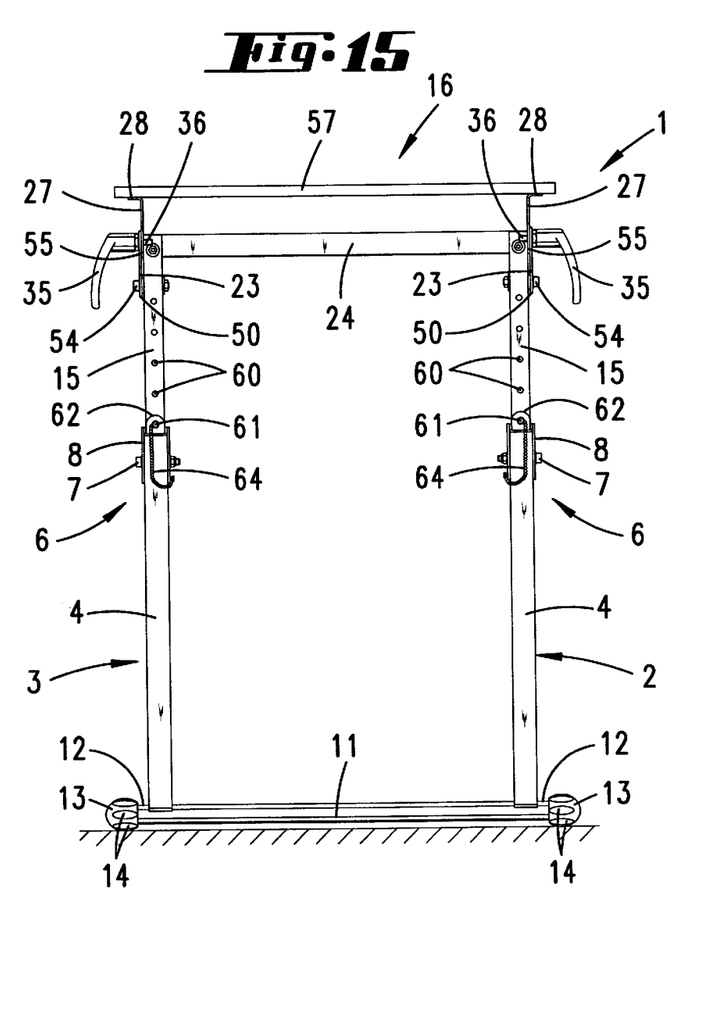
FIG. 15 is a front view of the bearing stand shown in FIG. 14.
Figures 16, 17, 18:
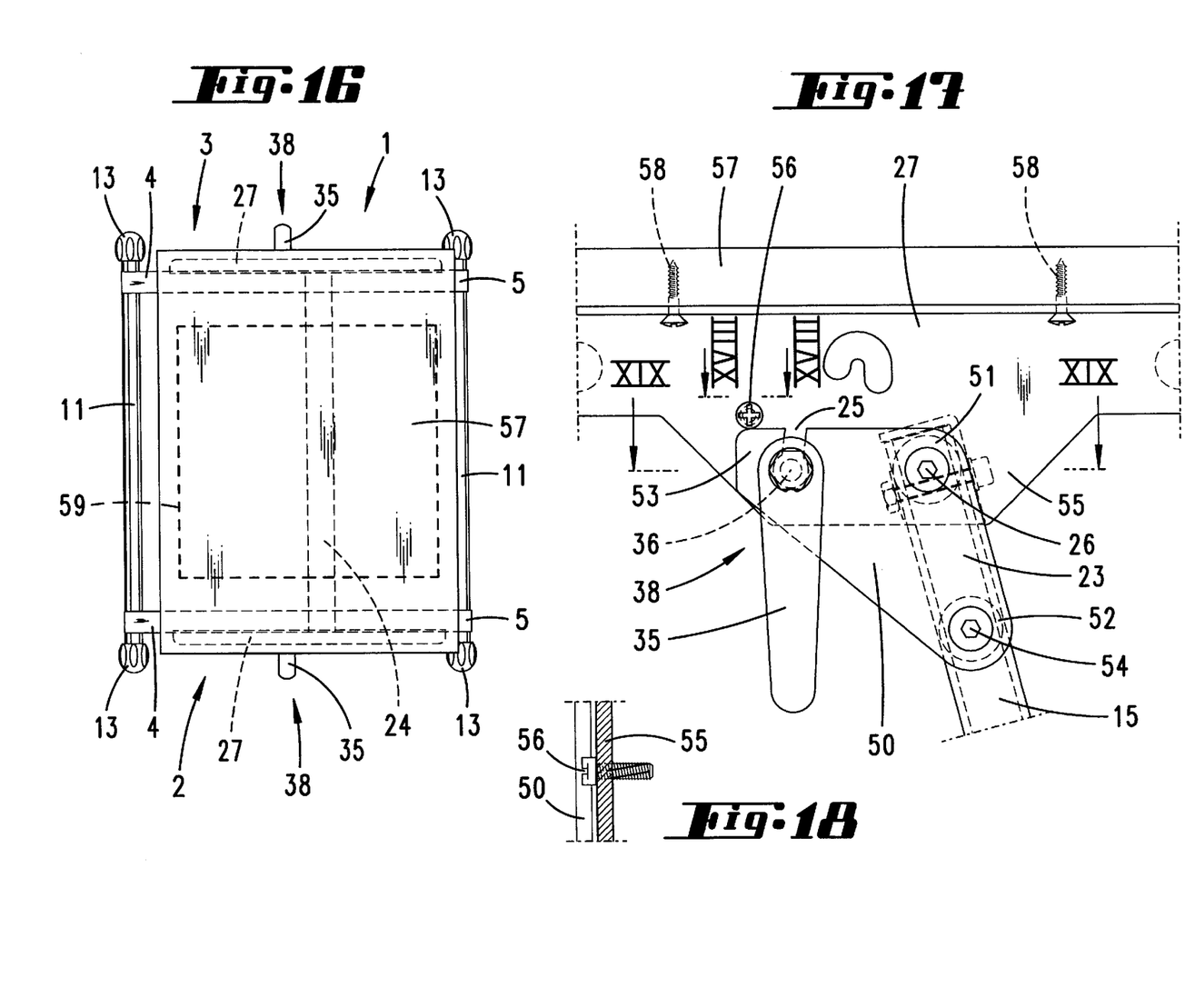
FIG. 16 is a plan view of the bearing stand shown in FIG. 14.
FIG. 17 is an enlarged side view of the region XVII in FIG. 14.
FIG. 18 is a sectional view taken along the line XVIII—XVIII in FIG. 17.

According to the side view in the FIGS. 14 and 17, margin edge, which is allocated to the support 15, of the triangular plate 50 is oriented parallel to a support margin edge. The second margin edge, which, together with the latter margin edge, forms the obtuse angle, extends in the horizontal direction in the standing position of the bearing stand 1.

The fastening of the triangular plate 50 at the support 15 occurs in two corners 51, 52, which cover the support end, whereby, in the obtuse angle 51, the fastening occurs via a pivot pin 26, which forms the axis of rotation for the assembly 16. The fastening in the region of the other corner 52 occurs via a conventional threaded joint by means of a screw 54 and given the insertion of a spacer disk (not illustrated) between triangular plate 50 and the support's side surface.

The triangular plates 50 project from the supports 15 in the direction of the longer legs 4 and have a slot opening 25, which is open above, in these protruding regions in the angle 53 formed there.

The fastening elements 23 project from the supports 15 in the direction of the longer legs 4 and have slit openings 25 in the protruding regions. The openings 25 being open from above.

The free end region of the supports 15 and the triangular plates 23 are penetrated by link pins 26 for the slewable mounting of the assembly 16 at the supports 15.

This assembly 16 is positioned between the end regions of the supports 15 and forms carriers 27 via which the assembly 16 is linked to the fastening elements 23.

The carriers 27 are constructed as angle plates and extend parallel to the pairs of legs 2, 3. The length of the carrier 27 is selected such that, in the service position of the bearing stand 1 according to FIG. 1, the assembly 16 is disposed vertically above the spread of the legs 4, 5. This configuration results in a good stability under load.

The vertical sides of the carriers 27 extend between the support's side surface and the triangular plate 50 and project in the central region in a trapezoidal, downward facing bearing projection 55. Approximately in the middle of their longitudinal extent, the carriers 27 are penetrated in the region of the bearing projection 55 by the axial bolts 26 for pivoting support. Due to the construction of the carriers 27 as angle plates, they form a flat support surface 28 with their shorter sides, which are perpendicular to the sides which are penetrated by the axial bolts 26.

In addition, three evenly spaced rollers 29 bear the opposed carriers 27, two rollers 29 being allocated to the freely protruding terminal regions of the carriers 27, and one roller 29 being allocated to the center region of the carriers 27.

The height of these rollers 29 is adjustable. To this end, axial extensions 30 of the rollers 29 rest in U-shaped bearing slits 31 of the carriers 27. The latter comprise U-legs 32, 33 of different lengths. If an axial extension 30,of a roller 29 is accordingly inserted into the shorter leg 32, the upper position of the appertaining roller 29 is thus achieved, only the crown region of the roller 29 projecting beyond the upper side of the carriers, which is formed by the supporting surface 28. A supported work piece 34 can be thereby easily displaced on the rollers 29 essentially parallel to the longitudinal extent of the carriers 27.

Figure 8:
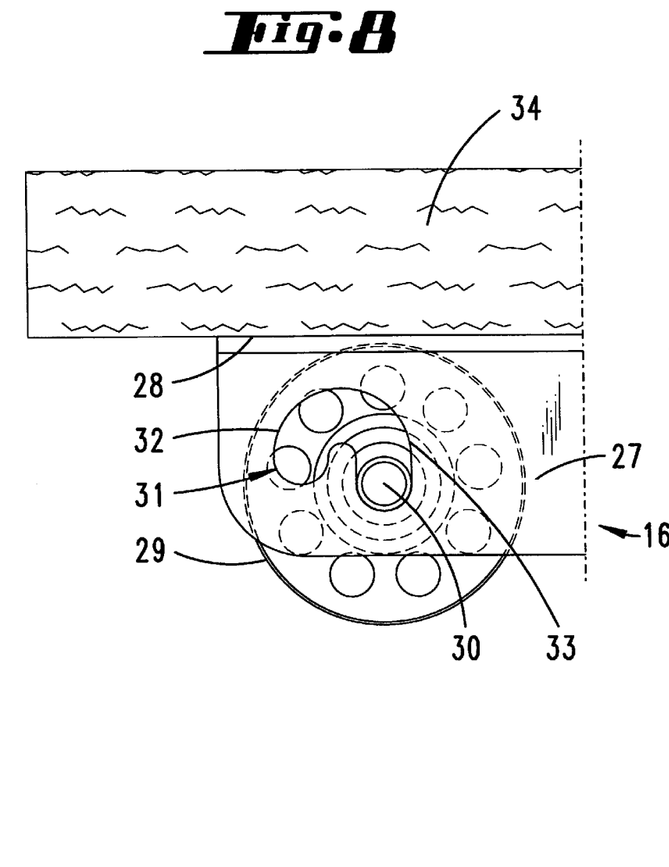
FIG. 8 is a view corresponding to FIG. 7, but after the lowering of the rollers of the assembly.

If, on the other hand, the axial extension 30 is moved into the longer U-legs 33 of the bearing slit 31, then this effects a lowering of the appertaining rollers 29 into a position beneath the upper side of the carriers, as in FIG. 8. A work piece 34 is thereby placed onto the supporting surface 28.

In addition, the height of the three rollers 29 can be separately adjusted. It is also possible to displace the height of each roller 29 on one side only, which effects an inclination of the relevant rollers 29 relative to the horizontals. If the rollers 29 are raised at one side or the other in alternation, then a valley-type guide mechanism arises in the direction of the displacement of the work piece, which is particularly advantageous given tubular work pieces.

The assembly is stabilized by two crossbars 40 connecting the carriers 27 between the rollers 29, the position and diameter of said crossbars being selected such that they are always situated beneath the crown region of the rollers 29, regardless of the height position of said rolls.

As previously mentioned, the whole assembly 16 is securely mounted at the supports 15, the service position according to FIG. 1 being fixable. To this end, the carriers 27 encounter a stop in the horizontal position. This is formed on each side of the carriers by a threaded stem 36 provided with a screw handle 35, which threaded stem submerges into the previously mentioned slot opening 25 of the allocated fastening element 23, or respectively, triangular plate 50. The threaded stems 36 are turned in threaded boreholes 37 of the vertical sides of the carriers 27, or respectively, of the bearing projections 55, which are likewise penetrated by the axle bolts 26. Due to the swiveling of the assembly 16 into the horizontal position, the threaded stems 36 insert into the slot openings 25, subsequent to which, due to the rotation of the handles 35, said handles encounter the allocated triangular plate 23 exteriorly, and due to further tightening, said plate braces against the adjacent carriers 27 at the inner wall. The slot ends of the slot openings 25 can serve as stop limits for orienting the assembly 16 in the horizontal. Alternatively, or at the same time, a peg 56 or a screw can be provided in the region of the bearing projection 55, which peg or head of a self-cutting screw contacts the horizontal edge of the triangular plate 50 on the top surface or upper side for the stop limit. The orientation of the slot openings is adapted to the swivelling path.

Figure 9:
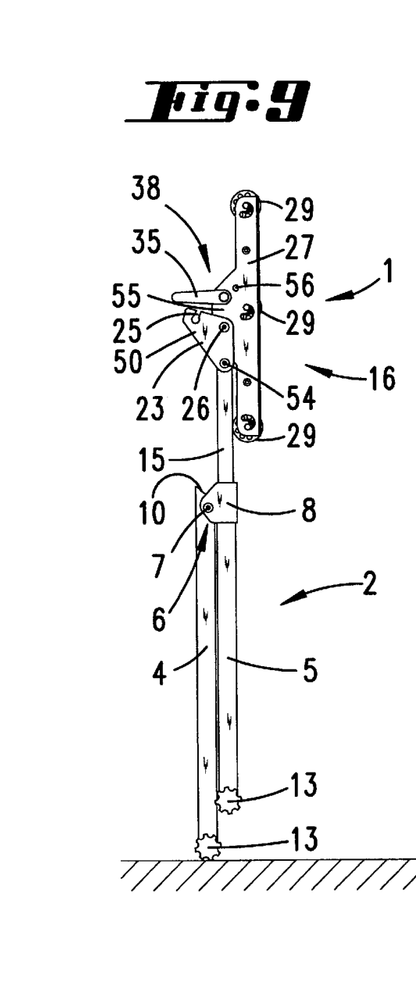
FIG. 9 is a side view of the bearing stand of FIG. 1 in the collapsed non-service position.

FIG. 9 depicts the collapsed position of the bearing stand 1. It can be seen that the legs 4 and 5 of each pair 2, 3 can be oriented in a parallel position by the loosening of the fixing means 17 and of the locking means 38 for the assembly 16, and that, furthermore, the carriers 27 of the assembly 16 also extend parallel to the supports 15. When collapsed into the non-service position, the bearing stand 1 merely stands on the standing caps 13 of the longer legs 4.

Figure 10:
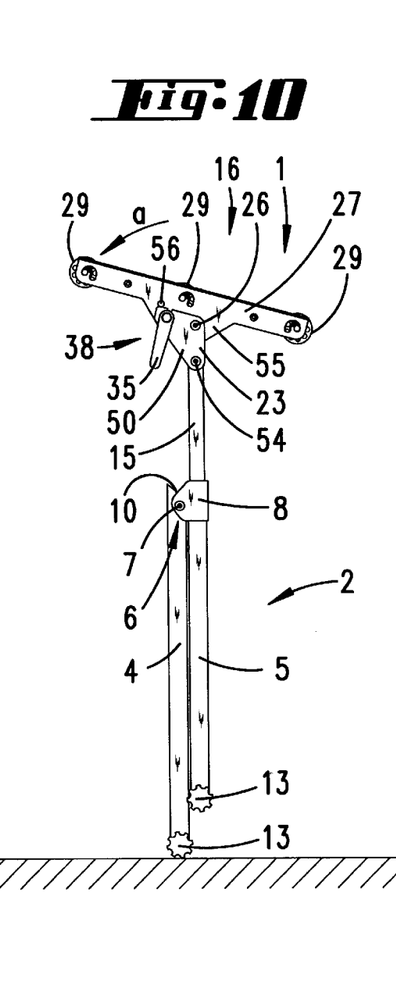
FIG. 10 is an illustration continuing from FIG. 9 in the course of the setup of the bearing stand, given a support assembly which has been swivelled up.
Figure 11:
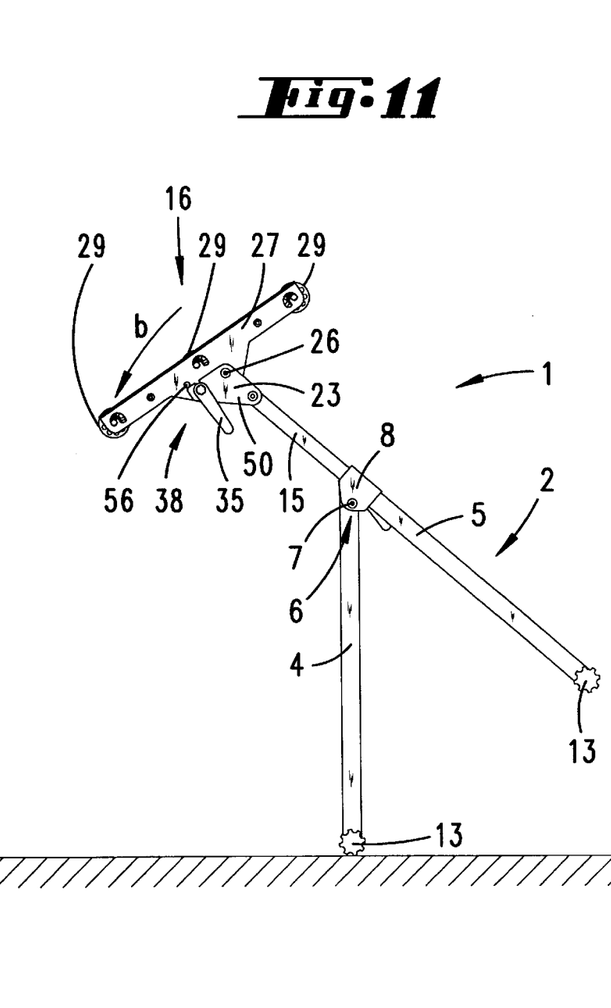
FIG. 11 is another continuing illustration, depicting the bearing stand in the course of the upward swivelling of the pairs of legs.

From this inactive position, a folding of the bearing stand 1 is possible in two ways. For one, a swivelling of the freely projecting end of the assembly 16 into the service position is possible by means of the grasping of the end of the assembly as shown in FIG. 10. From this position, depicted in FIG. 10, the folding of the leg pairs 2, 3 can occur by further pushing of said free end region of the assembly as shown in FIG. 11, and, conditional to the swivel direction (arrow a) of the assembly 16, or respectively, of the carriers 27 into the horizontal position being the same as the swivel direction (arrow b) of the legs into the angled position. The profiled standing caps 13 of the longer legs 4, which brace against the ground, therein prevent a sliding of the bearing stand 1. This results in a convenient folding of the bearing stand 1 in the standing position of the user, given only one continuous movement.

Figure 12:
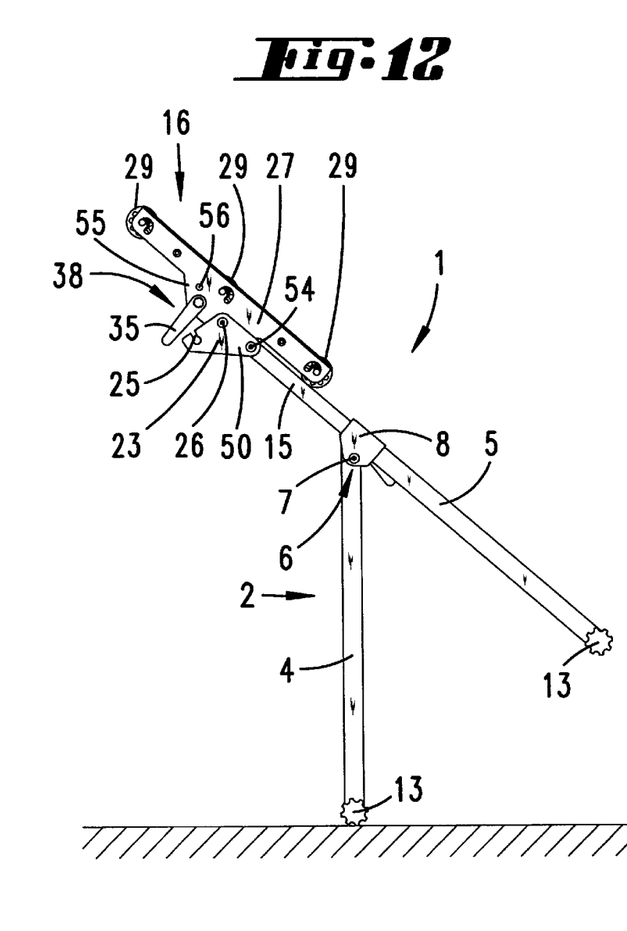
FIG. 12 is an illustration continuing from FIG. 9, in another setup variation in which the pairs of legs have first been swivelled up.
Figure 13:
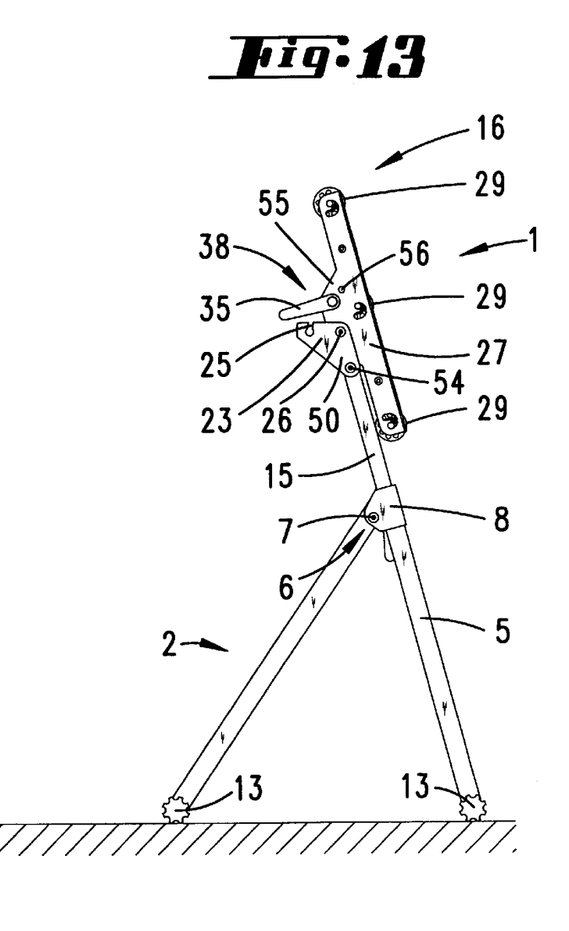
FIG. 13 is an illustration continuing from FIG. 12.

Alternatively, the folding can also occur as shown in FIGS. 12 and 13, whereby, proceeding from FIG. 9, the legs can be brought into their angled position—potentially by slight forward spreading by means of foot pressure against the cross-connector 11 of the shorter legs 5—by a grasping of the upper cross-connector 24, which connects the supports 15 to one another, and by subsequent swivelling displacement. If this position is achieved, the bearing stand 1 is set on the ground, as depicted in FIG. 13. Finally, the assembly 16 is swivelled into the horizontal service position and locked.

FIGS. 14 to 21 illustrate a second embodiment of the inventive bearing stand 1.

With the exception of the assembly and the design of the height adjustment, this exemplifying embodiment is largely the same as the previously described first exemplifying embodiment.

The assembly 16 is constructed as tabletop 57 here, which consists of wood or of a hard-fiber material similar to wood. This tabletop 57 is connected via screws 58 to the carriers 27, particularly to their horizontal sides. As can be seen in the illustrations, the base surface of the tabletop 57 is so dimensioned as to project somewhat beyond the carriers 27 on all sides.

The tabletop 57 serves as a carrier of a table saw (not illustrated) and forms a surface portion 59 in its center region which can be cut out. This portion is defined on the tabletop surface by a broken-line structure, as is illustrated in FIG. 16.

Once this surface portion 59 is cut out, a path is cleared for scrap removal in the use of a table saw. The space beneath the cuttable surface is clear for this scrap removal, being crossed only by the two cross-tie-bars 24 that connect the joints, or respectively, the fastening elements 23.

As in the first exemplifying embodiment, the height adjustment of the assembly 16 occurs by means of telescoping displacement of the supports 15 in the shorter legs 5. With respect to the securing of the adjusted height, however, a solution is selected here in which the supports 15 comprise a plurality of insertion openings 60 (e.g. five) which are evenly spaced in the longitudinal direction of the support. Through these openings 60, bolts 61 can be inserted, which brace on margin edges of the telescopic external tubular leg 5. In the illustrated exemplifying embodiment, the junction sheet 8 is provided with a projection 62, which partially covers the surface of the support that comprises the openings 60 and which has a borehole 63 that is adapted to the diameter of the opening.

Figures 19, 20:
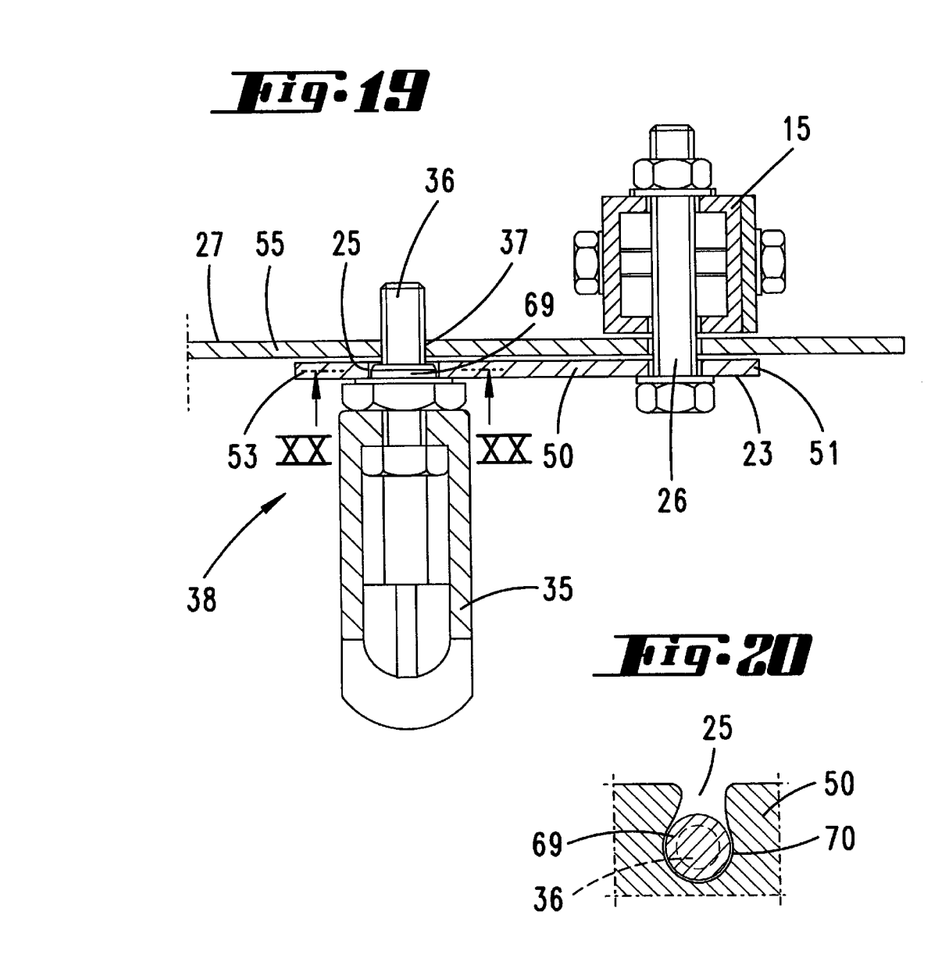
FIG. 19 is a sectional view taken along the line XIX—XIX in FIG. 17.
FIG. 20 is a sectional view taken along the line XX—XX in FIG. 19.
Figure 21:
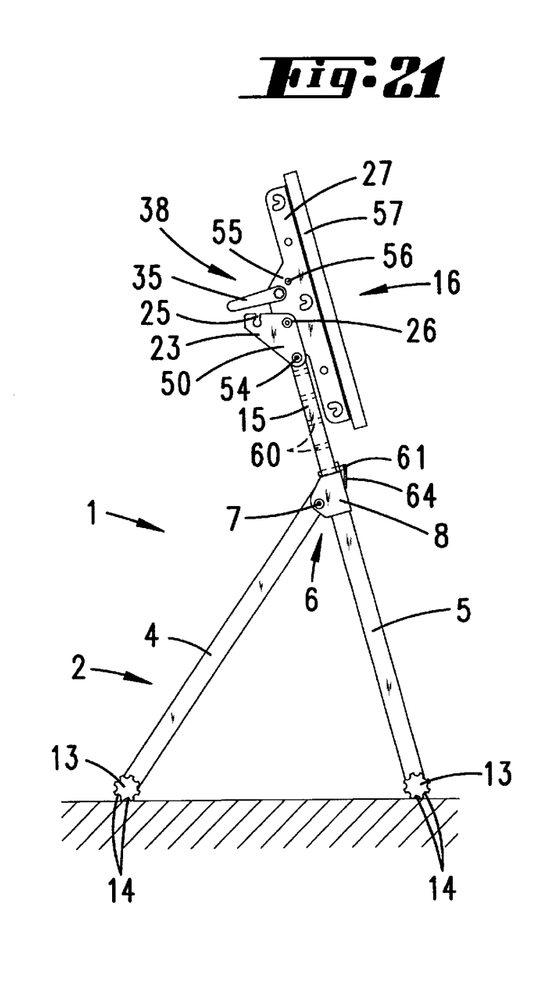
FIG. 21 is a view corresponding to FIG. 13, subsequent to the swivelling of the second embodiment, which is constructed as a tabletop, into a safe-keeping position.

The bolts 61 which hold the supports 15 at the desired height penetrate both the projection borehole.63 and the insertion opening 60 of the support 15, whereby a bracing occurs via the bolt 61 at the borehole margin edge (cf. FIGS. 20 and 21).

Figure 22:
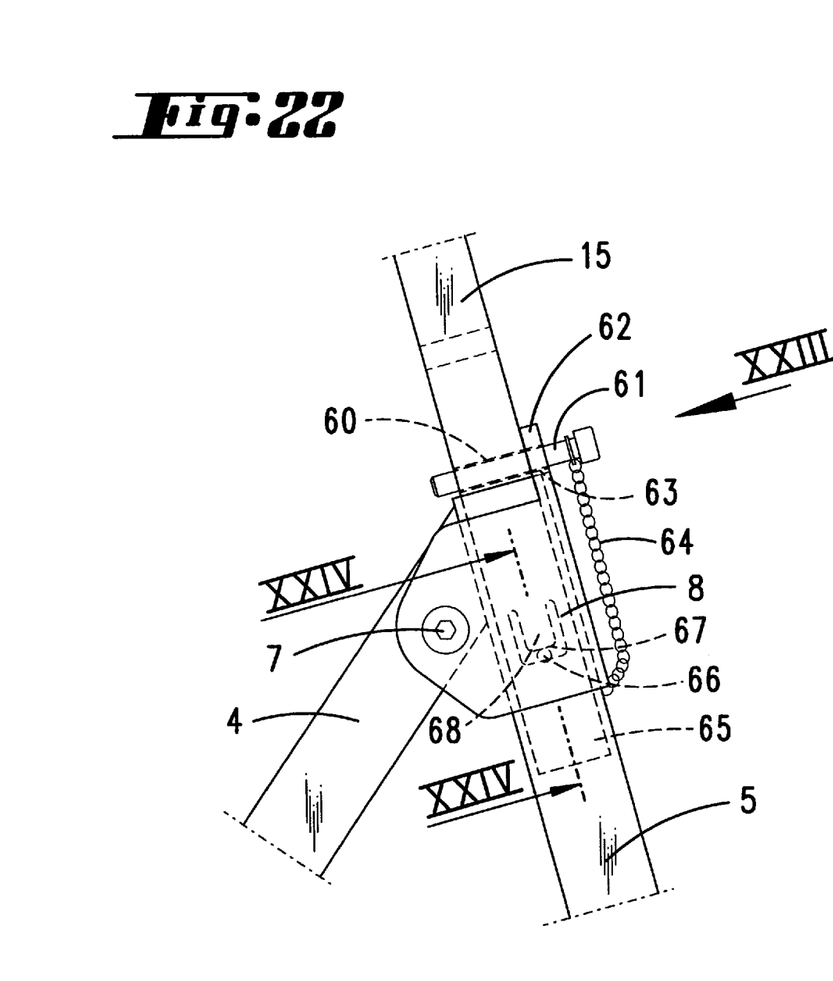
FIG. 22 is an enlarged view of the region XXII—XXII in FIG. 14.
Figure 23:
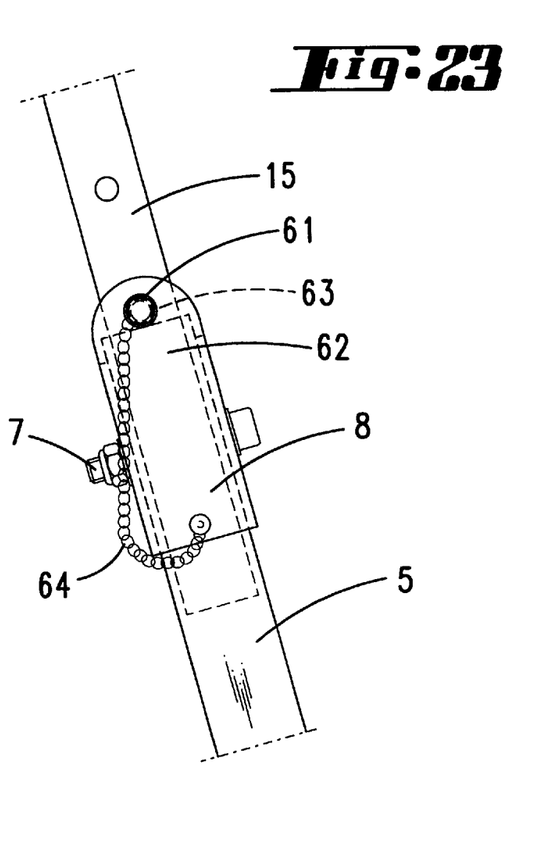
FIG. 23 is a view of the region according to arrow XXIII in FIG. 22.

In addition, as shown in FIGS. 22 and 23, each bolt 61 can be captively secured at the allocated junction sheet 8 by means of a chain 64 or the like, for example.

Figure 24:
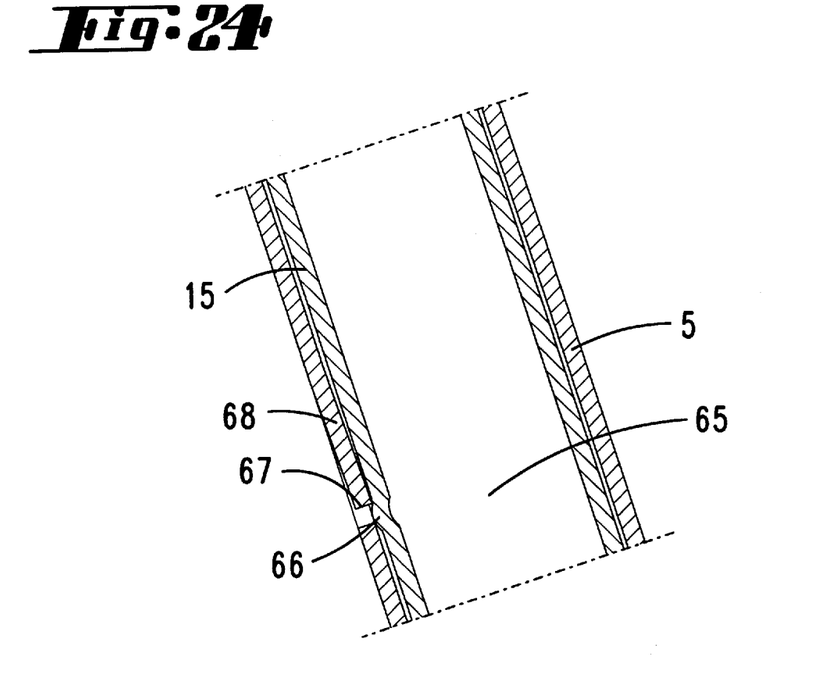
FIG. 24 is an enlarged sectional view taken along the line XXIV—XXIV in FIG. 22.
Figure 25:
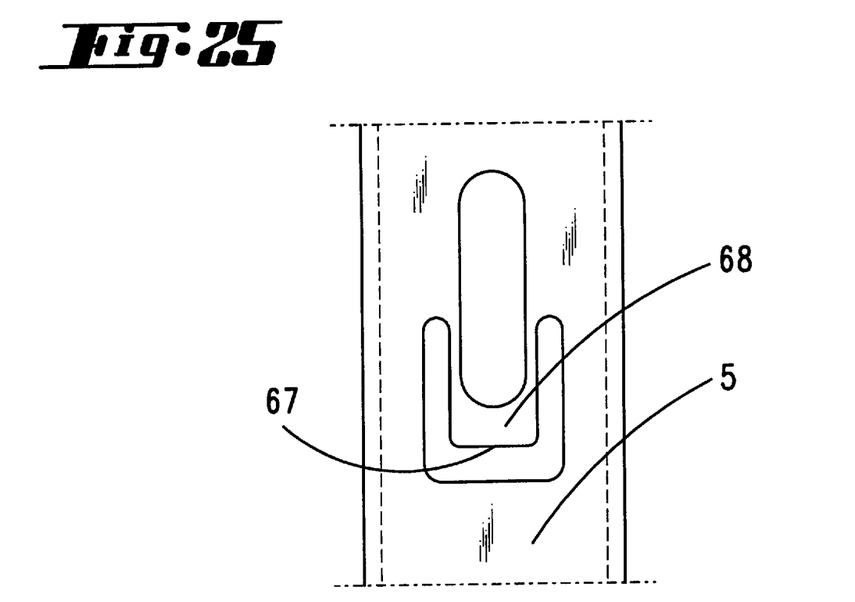
FIG. 25 is a partial view of an upper terminal region of a leg of the second embodiment that is constructed as a sleeve.

Referring to FIG. 24, a withdrawal protection of the supports 15 from the sleeve-like legs 5 is provided. To this end, the supports 15 are provided with a projection in the shape of a bellied-out or protruding portion 66 at the inserted end 65. This can be formed by a pressing out of the support material.

The bellied-out portion 66 acts in concert with a face edge, which forms a stop shoulder, of a free tongue 68 of the sleeve wall, or respectively, the leg wall. The tongue 68 is bent inward from out of the wall surface of the leg 5, for blocking complete withdrawal of the telescoping member 15.

Referring to FIGS. 17 and 18, the stop limit 56 for the definition of the preferred horizontal orientation of the assembly is formed by a screw which is screwed into the bearing projection 55. A screw with a self-cutting thread is preferred, whose head forms the stop limit 56 against the top face edge of the triangular plate 50.

In addition, the fixing of the assembly in the operative position is enabled by the positive cooperation of locking means 38 and triangular plate 50. To this end, the threaded stem 36 of the locking means 38 comprises a neck 69 of enlarged diameter (see FIG. 20), which connects to the screw handle 35 and which rests positively in an end 70 of the slot 25 of enlarged diameter in the captive position according to FIGS. 19 and 20. Due to the turning of the threaded stem 36, the neck region enters the enlarged slot region.

The bottleneck-like tapering of the slot 25 in the direction of the opening forms a swivel block for the assembly 16.

The disclosure contents of the relatively priority documents and copy of the prior application are also hereby incorporated in their entirety into the disclosure of the application for the purpose of incorporating features of these documents in claims of the present application.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

We claim:

1. A combination adjustable height bearing stand and platform assembly, the combination bearing stand and platform assembly comprising:

two pairs of legs, the pair of legs being pivotally linked together at a joint connection for pivotal movement with respect to one another between a parallel position into an angled position, one of the legs hollow and telescopically receiving a height-adjustable support, each height-adjustable support being secured in place by a fixing element disposed above the joint connection, each height-adjustable support comprising a distal end connected to a fastening element, each fastening element being connected to a bearing projection connected to a carrier, each carrier being connected to and supporting a platform assembly, each bearing projection also being connected to a screw handle, each fastening element comprising a triangular plate having three corners including a first corner connected to a distal end of its respective height-adjustable support, a second corner pivotally connected to its respective bearing projection and a third corner comprising a slot for receiving the screw handle connected to its respective bearing projection.

2. The combination bearing stand and platform assembly of claim 1 wherein each carrier comprises an elongated angle plate.

3. The combination bearing stand and platform assembly of claim 1 wherein each carrier comprises a mid-section and each bearing projection is connected to the mid-section of its respective carrier.

4. The combination bearing stand and platform assembly of claim 1 wherein each bearing projection is trapezoidally shaped and extends downward from the carrier.

5. The combination bearing stand and platform assembly of claim 2 wherein each angle plate comprises a vertical wall and each bearing projection is trapezoidally shaped and extends downward from the vertical wall of its respective carrier.

6. The combination bearing stand and platform assembly of claim 1 wherein each triangular plate is an obtuse triangle with the second corner of each triangular plate being obtuse angled.

7. The combination bearing stand and platform assembly of claim 1 wherein each screw handle comprises a stem with an enlarged neck portion and a threaded portion and each bearing projection comprises a threaded aperture for receiving the threaded portion of the stem of its respective screw handle and the slot disposed in the third corner of each triangular plate accommodates the enlarged neck portion of the stem of its respective screw handle.

8. The combination bearing stand and platform assembly of claim 1 wherein the bearing projection further comprises a stop limit for engaging the third corner of its respective triangular plate.

9. The combination bearing stand and platform assembly of claim 8 wherein each stop limit comprises a screw.

10. The combination bearing stand and platform assembly of claim 9 wherein each screw comprises a head for engaging the third corner of its respective triangular plate and a self-cutting thread portion.

11. The combination bearing stand and platform assembly of claim 1 wherein each fixing element comprises a bolt and each adjustable support comprises at least one through hole for receiving the bolt and the each leg that telescopically receives one of the adjustable supports comprises an edge for engaging the bolt passing through its respective adjustable support.

12. The combination bearing stand and platform assembly of claim 1 wherein each adjustable support comprises a lower end telescopically inserted into one of the legs, the lower end of each support comprising an outwardly projecting section, each of the legs that telescopically receives one of the adjustable supports comprises an upper end that comprises a stop shoulder for engaging the outwardly projecting section of its respective adjustable support to prevent a complete withdrawal of the adjustable supports from upper ends of their respective legs.

13. The combination bearing stand and platform assembly of claim 12 wherein each outwardly projection section comprises a bellied-out portion of its respective adjustable support.

14. The combination bearing stand and platform assembly of claim 13 wherein each stop shoulder comprises an inwardly extending tongue.

15. The combination bearing stand and platform assembly of claim 1 wherein the platform assembly comprises a table top for supporting a saw.

16. The combination bearing stand and platform assembly of claim 15 wherein the table top comprises a removable center portion.

17. The combination bearing stand and platform assembly of claim 16 wherein the platform assembly further comprises an open space disposed below the removable center portion for scrap removal.

18. The combination bearing stand and platform assembly of claim 15 wherein the platform assembly further comprises a tie bar that extends underneath the removable portion and that connects the two carriers together.

19. The combination bearing stand and platform assembly of claim 15 wherein the table top comprises wood.

20. The combination bearing stand and platform assembly of claim 1 wherein each pair of legs comprising a shorter leg and a longer leg, each shorter leg being hollow and telescopically receiving one of the height-adjustable supports.

21. A combination adjustable height bearing stand and platform assembly, the combination bearing stand and platform assembly comprising:

two pairs of legs, the pair of legs being pivotally linked together at a joint connection for pivotal movement with respect to one another between a parallel position into an angled position, one of the legs hollow and telescopically receiving a height-adjustable support, each height-adjustable support being secured in place by a fixing element disposed above the joint connection, each fixing element comprises a bolt and each adjustable support comprises at least one through hole for receiving the bolt and the each leg that telescopically receives one of the adjustable supports comprises an edge for engaging the bolt passing through its respective adjustable support, each height-adjustable support comprising a distal end connected to a fastening element, each fastening element being connected to a bearing projection connected to a carrier, each carrier comprises an elongated angle plate having a mid-section and each bearing projection is connected to the mid-section of its respective carrier, each carrier being connected to and supporting a platform assembly, each bearing projection also being connected to a screw handle, each fastening element comprising a triangular plate having three corners including a first corner connected to a distal end of its respective height-adjustable support, a second corner pivotally connected to its respective bearing projection and a third corner comprising a slot for receiving the screw handle connected to its respective bearing projection, each adjustable support comprises a lower end telescopically inserted into one of the legs, the lower end of each support comprising an outwardly projecting section, each of the legs that telescopically receives one of the adjustable supports comprises an upper end that comprises a stop shoulder for engaging the outwardly projecting section of its respective adjustable support to prevent a complete withdrawal of the adjustable supports from upper ends of their respective legs.

22. A combination adjustable height bearing stand and platform assembly, the combination bearing stand and platform assembly comprising:

two pairs of legs, the pair of legs being pivotally linked together at a joint connection for pivotal movement with respect to one another between a parallel position into an angled position, one of the legs hollow and telescopically receiving a height-adjustable support, each height-adjustable support being secured in place by a fixing element disposed above the joint connection, each fixing element comprises a bolt and each adjustable support comprises at least one through hole for receiving the bolt and the each leg that telescopically receives one of the adjustable supports comprises an edge for engaging the bolt passing through its respective adjustable support, each height-adjustable support comprising a distal end connected to a fastening element, each fastening element being connected to a bearing projection connected to a carrier, each carrier comprises an elongated angle plate having a mid-section and each bearing projection is connected to the mid-section of its respective carrier, each carrier being connected to and supporting a platform assembly, each bearing projection also being connected to a screw handle, each fastening element comprising a triangular plate having three corners including a first corner connected to a distal end of its respective height-adjustable support, a second corner pivotally connected to its respective bearing projection and a third corner comprising a slot for receiving the screw handle connected to its respective bearing projection, the bearing projection further comprises a stop limit for engaging the third corner of its respective triangular plate, each adjustable support comprises a lower end telescopically inserted into one of the legs, the lower end of each support comprising an outwardly projecting section, each of the legs that telescopically receives one of the adjustable supports comprises an upper end that comprises a stop shoulder for engaging the outwardly projecting section of its respective adjustable support to prevent a complete withdrawal of the adjustable supports from upper ends of their respective legs, each screw handle comprises a stem with an enlarged neck portion and a threaded portion and each bearing projection comprises a threaded aperture for receiving the threaded portion of the stem of its respective screw handle and the slot disposed in the third corner of each triangular plate accommodates the enlarged neck portion of the stem of its respective screw handle.

* * * * *